July 24, 1923.
C. C. PEELER
1,462,620
TORCH FOR USE IN ELECTRIC WELDING AND HOLDER THEREFOR
Filed March 19, 1921
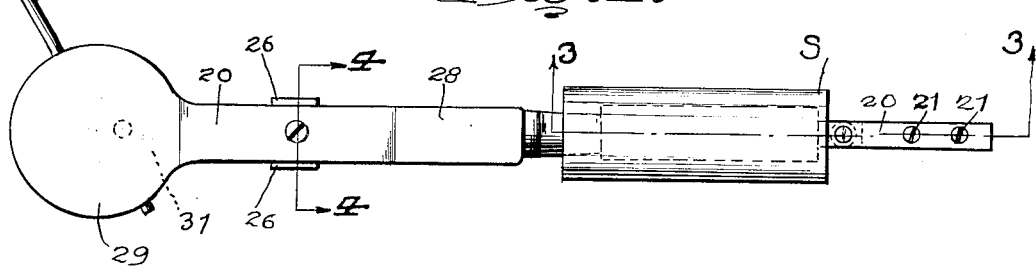
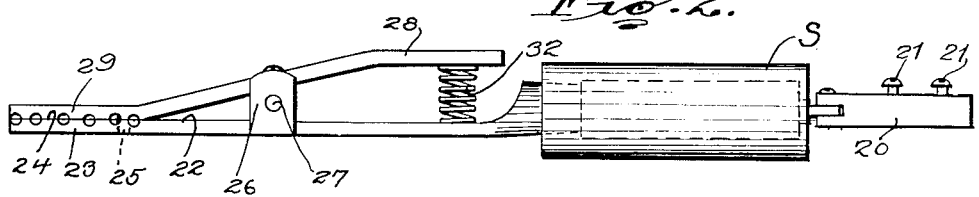
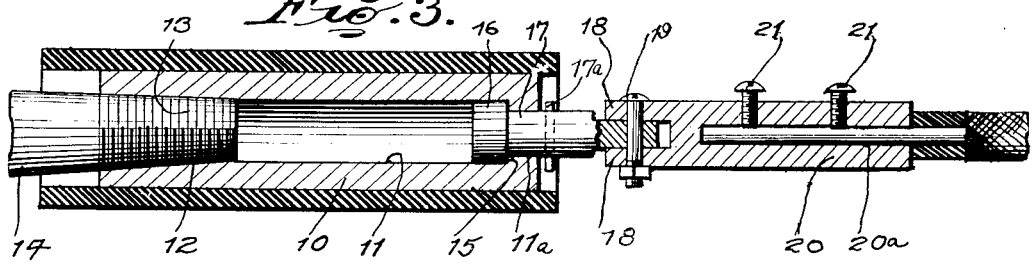
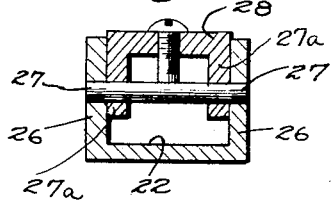 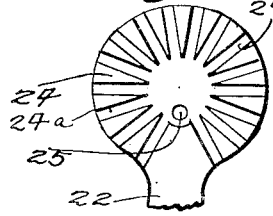 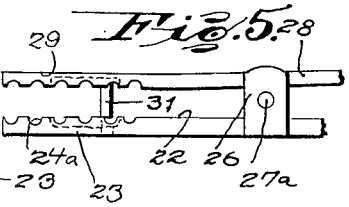
C. C. Peeler.
INVENTOR.
Watson E. Coleman
ATTORNEY.

Patented July 24, 1923.

1,462,620

UNITED STATES PATENT OFFICE.

CAMERON C. PEELER, OF CHARLESTON, WASHINGTON.

TORCH FOR USE IN ELECTRIC WELDING AND HOLDER THEREFOR.

Application filed March 19, 1921. Serial No. 453,805.

*To all whom it may concern:*

Be it known that I, CAMERON C. PEELER, a citizen of the United States, residing at Charleston, in the county of Kitsap and State of Washington, have invented certain new and useful Improvements in Torches for Use in Electric Welding and Holders Therefor, of which the following is a specification, reference being had to the accompanying drawings.

This invention relates to improvements in torches for use in electric welding and holder therefor.

An important object of the invention is to provide in an electric torch means for holding the welding wire so that it may be disposed in any desired direction and may at the same time be readily detachable from the torch proper.

A further object of the invention is to provide a torch having pivotal jaws which are held in engagement with the welding wire by means of a spring, the construction and mounting of the jaws being such that the spring is situated at a point remote from the point at which the weld takes place in order that the spring may not be destroyed by the heat of welding.

A further object of the invention is to provide a torch which may be readily detached from the holder in which it is employed so that the torch may be readily transported from place to place, thus permitting a workman to at all times employ a torch with which he is familiar.

A still further object of the invention is to provide an improved holder for the torch whereby the torch is connected to the lead in which a combined swivel and hinge connection between the lead wire and the holder is employed, thus eliminating the breakage due to twisting of the lead wire during the welding operation.

As all those familiar with the art are well aware, a welding operation when started is best not discontinued until completed since chilling of the weld requires an extra amount of current to overcome the chill, and furthermore, welded metal is often much harder to bring to a welding heat than metal which has not been welded. With the ordinary type of connection or holder employed for electric torches the twisting of the torch to bring the welding wire into engagement with the various parts of the weld is imparted to the lead wire and results in breakage of the strands thereof. This breakage of course results in heating up of the lead and this heat eventually reaches a point where it becomes necessary to discontinue the welding operation. This disadvantage is eliminated by the construction above suggested.

Other objects and advantages of the invention will become apparent throughout the course of the following description:

In the accompanying drawings wherein for the purpose of illustration is shown a preferred embodiment of my invention and wherein like reference characters designate like parts throughout:

Figure 1 is a plan view of a torch and holder therefor constructed in accordance with my invention, Figure 2 is a side elevation thereof, Figure 3 is a sectional view partially in elevation of the holder employed, Figure 4 is a section on line 4—4 of Figure 1, Figure 5 is a fragmentary side elevation of the jaws showing same in an open position, and Figure 6 is a plan view of the lower jaw.

Referring now more particularly to the drawings, the numeral 10 indicates a holder body preferably cylindrical in form and having an axial bore 11, one end of which tapers outwardly toward the end of the body portion 10. This tapered portion may be, if so desired, screw-threaded for engagement with the screw-threaded end of the body portion 14 of the torch. If desired, the body portion 14 may have its end simply tapered and not screw-threaded, and the tapered portion 12 of the bore 11 may be likewise made plain, giving between the body portion 14 and the torch and the holder a slip-joint connection.

The opposite end of the bore 11 is reduced as at 11ª to form within the body portion 10 a shoulder 15, against which is seated the head 16 of the swivel 17 which is rotatably mounted within bore 11ª. The end of the swivel 17 projects beyond the end of the body portion 10 and is flat to be received between the forked portions 18 formed on the end of the lead connection 20 and is pivotally connected to these forked portions as at 19. A cotter pin 17ª extending through the end of the swivel 17 and engaging the holder body maintains the head 16 in engagement with the shoulder 15. The opposite end of the lead attaching member 20, provided with a bore 20ª adapted for the reception of the conductor of a lead L, the conductor being held within the lead attaching member by means of set-screws 21 or the like. In practice, the holder 10 and a portion of the torch 14 are covered by an insulatory sleeve S, a section of rubber hose such as employed on air lines being found suitable.

It will be obvious with the construction employed the lead wire L does not have imparted thereto any rotation which may be applied to the body portion 10 and torch 14, and it will likewise be obvious that the torch 14 may be readily removed from the holder and the holder dropped upon a metallic deck or structure without damage because of the insulatory sleeve employed. Particular attention is directed to the ready detachment of the torch from the holder and to the swivel connection of the holder to the lead wire.

The main or body portion 14 of the torch is flattened forwardly of its point of attachment to the handle or holder 10, as indicated at 22, and the extreme outer end thereof is provided with an enlargement 23 forming a head or jaw preferably substantially circular in plan. The upper face of the jaw 23 is cupped as at 23ª to form a marginal rim 24 which is provided with radially directed grooves 24ª and has formed therein adjacent the center thereof an opening 25, the purpose of which will presently appear.

The flattened portion 22 of the main or body portion 14 of the torch is provided intermediate its ends with upstanding ears 26 apertured for the pivotal reception of a pin 27. The pin 27 likewise extends through the apertured ears 27ª of a pivot arm 28 extending in the same general direction as the body portion of the torch and provided at its outer end with an enlarged portion 29 forming a head or jaw corresponding to the jaw 23 of the body portion 14 and coacting therewith. This head is likewise cupped and is provided upon the rim thereof coacting with the rim 24 of the head 23 with grooves 29 corresponding in number and arrangement to the grooves 24 of the head 23 and combining therewith for the interchangeable reception of a welding wire. Projecting downwardly from the face of the head 29 is a pin 31 which is adapted to enter the opening 25 of the head 23 when the jaws 23 and 29 are holding therebetween a welding wire to prevent relative displacement of the jaws. This pin, when the jaws are partially separated as shown in Figure 5, extends into the path of a welding wire being inserted and insures that the welding wire will be placed diametrically of the heads, as all that is necessary to insure diametrical placing is to bring the wire into engagement with the pin. The cupped construction of the jaws provides for an efficient engagement of the welding wire at spaced points so that the wire will be rigidly held.

It will be obvious that where a wire is disposed between the jaws, if the jaws depended upon the pivot block 27 to hold them in engagement, the strain placed upon the welding wire would cause the jaws to have a slight shifting movement which would probably result in arcing and eventually in welding together of the jaws. All danger of such shifting is effectually eliminated by the use of the pin engagement employed. In order to hold the jaws 23 and 29 in engagement a spring 32 is disposed intermediate the end of the arm 28 remote from the jaw 29, and the flattened portion 22 of the body portion 14 of the torch at a corresponding point. In this location the spring is not subjected to the intense heat of welding and accordingly its destruction is prevented.

From the foregoing it will be obvious that I have constructed an electric torch and holder therefor which is particularly well adapted for use by reason of the fact that the welding wire may be held at any desired angle by the jaws thereof and by reason of the fact that shifting of the wire in the jaws is prevented. Furthermore, the features of detachability of the torch and the swivel connection of the lead wire to the holder are such as to render a torch constructed in accordance with my invention extremely desirable.

It will furthermore be obvious that construction as hereinabove set forth is capable of some change without materially departing from the spirit of my invention, and I accordingly do not limit myself to the specific construction hereinbefore set forth except as hereinafter claimed.

What I claim is:

In an electric torch, coacting spring-pressed jaws having their coacting faces correspondingly radially grooved, one of said jaws having an opening formed therein and a pin carried by the other of said jaws and adapted to enter the opening of the first named jaw when the jaws are in engagement said grooves being tangential to said pin.

In testimony whereof I hereunto affix my signature.

CAMERON C. PEELER.